G. A. BORGARDT.
LANDING NET.
APPLICATION FILED MAY 2, 1911.
1,088,766.
Patented Mar. 3, 1914.
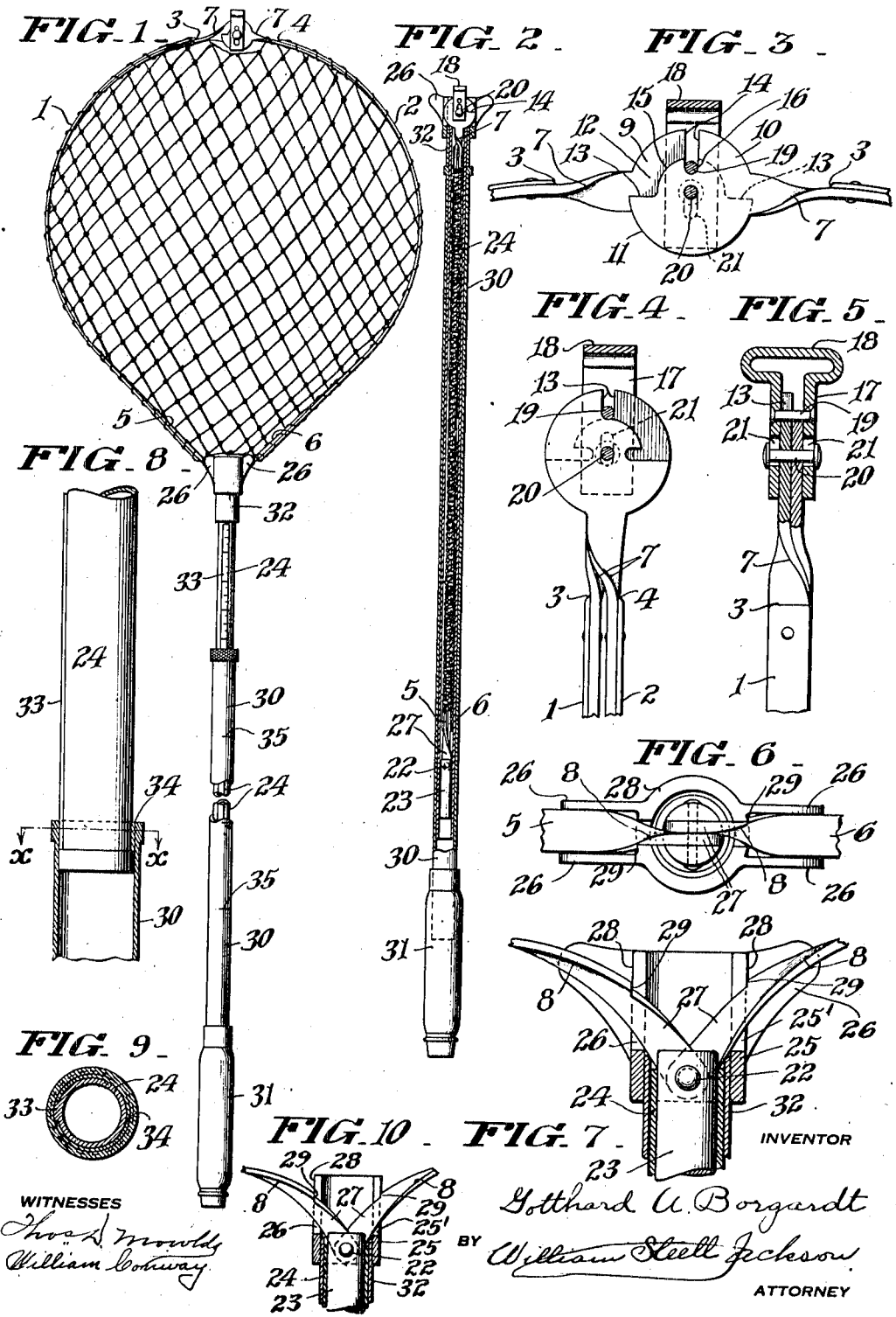

UNITED STATES PATENT OFFICE.

GOTTHARD A. BORGARDT, OF CAMDEN, NEW JERSEY.

LANDING-NET.

1,088,766.

Specification of Letters Patent.

Patented Mar. 3, 1914.

Application filed May 2, 1911. Serial No. 624,593.

*To all whom it may concern:*

Be it known that I, GOTTHARD A. BORGARDT, a citizen of the United States, and a resident of Camden, New Jersey, have invented a certain new and useful Landing-Net, of which the following is a specification.

My invention relates to a collapsible and telescopic landing net and means for easily and securely fastening the parts when in extended position.

The main purposes of my invention are to improve the locks by which the parts of the net frame are held in extended position and to support the inner net frame members against vertical strain.

A further purpose of my invention is to make the grip section of the handle capable of direct attachment to the net section, cutting out the intermediate telescoping sections when a short handle is desired.

A further purpose of my invention is to prevent turning of the handle of the net while permitting the parts thereof to telescope, and to mount a measure upon the fin which I prefer to use for this purpose.

A further purpose of my invention is to combine measuring notations of different degrees of fineness upon two telescopic members.

A further purpose of my invention is to guard against loosening of the lock by which the outer end of a collapsible net is held open and to make this lock easily operable by one hand.

Further purposes of my invention will appear in the specification and claims hereof.

I have preferred to illustrate my invention by a form thereof which is simple and inexpensive and which I have found in practice to be highly successful, though I recognize that it may be embodied in various other forms.

Figure 1 is a broken elevation of the preferred form of my landing net and handle in extended position. Fig. 2 is a longitudinal section of the form shown in Fig. 1, the parts being in telescoped position. Fig. 3 is a section of the outer net frame lock in extended position. Figs. 4 and 5 are longitudinal sections of the same lock, taken at right angles to each other with the side frame rod in collapsed position ready for telescoping within the handle. Figs. 6 and 7 are an end elevation and longitudinal section of the rear lock of the net frame, holding it in extended position. Figs. 8 and 9 are a longitudinal section and a transverse section upon line *x—x* thereof, showing the means for preventing rotation of the telescoping handle parts. Fig. 10 is a broken longitudinal section of the structure shown in Fig. 7 but omitting the frame-supporting ears thereof.

Similar numerals of reference indicate like parts in the drawings.

For the frame members 1 and 2, I prefer to use normally straight, flat spring strips supporting the net and, for strength and convenience in manipulation, I prefer to secure these strips at their ends to terminals 3, 4 at the outer ends and 5, 6 at the inner ends. Reinforced terminals are desirable at both ends because they avoid the necessity of twisting the tempered material. They are beneficial at the outer end because I desire to attach disks or plates there, which can be made integral with the terminal strips, and at the inner ends so that tapering depth or thickness may give additional strength. I prefer to turn the terminals 3, 4, 5 and 6 axially at 7, 8 through a quarter turn so as to prepare them for pivotal connection, making them extensible and collapsible by movement across the net, and to make the outer strips integral with plates 9, 10 which coöperate with other parts to form the outer joint. I turn the adjoining terminals in the same direction so that the turned or twisted parts may interfit and lie snugly together when the parts are collapsed.

The plates 9 and 10 are preferably identical in construction but reversely placed. Each is most desirably composed of a disk having a circular edge 11 throughout the greater part of its circumference, recessed at 12 for approximately 90° to form shoulders 13, 14 and circular intermediate portions 15. In proximity to the shoulder 14, I form a slot 16, one side of which is practically an extension of the shoulder 14. In the form shown, I partially inclose the two disks 9 and 10 within a strap or loop 17, whose outer end is preferably flattened at 18 to give a better hold for convenience in operation of the lock. The two sides of the loop are joined by a pin 19 which lies within the recesses 12, and can be moved into the slots 16 when they register. The two plates or disks 9, 10 are pivoted about a pin 20 which extends beyond the surfaces of the plates to afford a stop, preventing excessive movement of the loop 17, and fits within slots 21 in the loop so that these slots, together with the pin 19, determine the desired extent and position of the movement of the loop.

The plates lie side by side and, as seen in Fig. 2, when the frame members 1 and 2 are collapsed, the pin 19 lies between the shoulders 13 of the two plates or disks, being retained against outward movement by the engagement of the pin 20 against the loop. During the movement of the plates upon each other, as the frame members 1 and 2 diverge to open the net, the pin 19 rides upon or near the circular surface 15 of the two disks or plates until a position corresponding to Fig. 3 is reached, at which the pin is engaged between the shoulders 14 of the said disks. At the time that these shoulders 14 are approximately parallel, the slots 16 register and the pin 19 is free to move within the space thus formed into the slots 16, in which position it locks the net frame parts against movement in either direction. The spring of the net frame parts normally retains the pin in this position, in which it remains until it is released by pressure of the end of the net frame toward the handle and outward pressure upon the loop. The pin and loop are retained against accidental displacement by the gripping action of the shoulders 14 upon the pin, since any movement of the ends of the net frame members toward the handle without outward pressure of the loop results in the outer edges of the shoulders 14 approaching each other, forming a wedge-shaped opening which grips the pin too quickly for it to fall out of the opening. In practice, this fact has proved a complete protection against accidental displacement. The protection can be increased by any desired frictional engagement of the loop against the faces of the disks or plates.

The turned inner terminals 5 and 6 are pivoted at 22 to or within a stub 23 which fits within the handle parts. I prefer to use a single pivot for them to make the net as compact as possible.

I prefer to terminate the outer handle section by a fitting 25, which, in its preferred form, is slotted at 25′ and carries ears 26 on each side of the slot, spaced a distance but slightly in excess of the depth of the terminals 5 and 6 at the outer point where the twisting of these terminals begins. When the net is being set within the handle, and in extended position for use as a net, the parts 5 and 6 are pressed outwardly until their inner turned end portions at 27 will pass within the slots 25′, the edges meantime passing between the ears 26 and being supported thereby. The retractive force of the spring frame members effectively engages these terminals 5 and 6 against the outer surfaces 28 of the fitting, adjoining the slots.

In order to avoid wedging of the terminals within the slots, I provide definite shoulders 29 for engagement against the outer part of the fitting. When the net frame has been collapsed and is telescoped within the handle, the disks 9 and 10 lie within the slots 28 and the end 18 of the loop 17 forms a partial closure for the end of the fitting 25, which closure may be made as complete as is desired by giving any desired size to the loop.

To change the net from the position shown in Fig. 1 to that shown in Fig. 2, the ends of the net frame are pressed slightly toward the handle at the same time that the loop is pressed or pulled outwardly to release the catch. The inner ends of the net frame are then stretched slightly outwardly at the same time that they are moved forward bodily to withdraw them from the slots 28 and from between the ears 26. The entire net, along with the stub 23, can then be removed from the handle for the collapsing and wrapping of the net frame and net, if desired. The frame parts 1 and 2 spring to their normal straight position and the net is wrapped closely about the frame parts without removal therefrom. The entire net frame and net can now be telescoped within the end of the handle and will ordinarily engage frictionally with the handle for retention therein.

I have shown the handle as composed of two collapsing sections 24, 30 and a grip 31. The outer end of the section 30 may be slightly enlarged and decorated, as shown, for additional strength and improved appearance if desired. I prefer to form the end 32 of the fitting 25 of the same outside diameter as that of the section 30 in order that the sections 24 and 30 may be removed from the fitting and grip and that the fitting may be placed directly within the grip for use as a short handle. Since the fitting 25 and the grip 31 need not be withdrawn from the sections 24 and 30, respectively, except for this "short handle" use, and are not moved telescopically upon them in use, the fit between these parts may be made tight enough to prevent turning. In the case of the telescoping handle parts, however, easy telescopic movement would require a looseness of fit which would permit turning if no provision be made against it. To prevent this, I provide a strip 33 upon the section 24, and give room for it to slide through a gap or opening in a collar or ferrule 34. The edges of the collar or ferrule, which define this opening, prevent turning by engaging the edges of the strip.

I place a measure containing comparatively fine graduations upon the strip 33, and make it of such length as to be sufficient for the measurement of short fish without unduly extending the section. In order to make the measurement of larger fish possible and convenient, I place what I here term "major" graduations 35 upon the section 30 and at much greater intervals than those of the scale upon strip 33. I prefer to make the major graduations six inches or a foot apart. Since the measure 33 telescopes within the section 30, one end of a large fish may be placed at one of the major graduations and the other end of the fish may be readily seen upon the "minor" graduations of the scale 33. This can be conveniently done to obtain the measurement in either of two ways. The section 24, carrying the strip 33, can be telescoped within the section 30 until the outer end of the scale 33 registers with the end of the fish, after which the reading upon the minor scale can be taken at the last point visible outside of section 30. This would involve graduation of the scale 33 from its outer end inwardly. If the scale 33 be graduated beginning at the inner exposed end, the reading upon it can be taken directly from the end of the fish. In either event, the length represented by the distance from the end of the section 30 to the major graduation used would be mentally added to the reading. I thus afford simple, convenient and inexpensive combination measuring means in connection with my handle.

Throughout my specification I have considered the element 17 as a loop, surrounding the two terminals 9, 10, because this forms a strong, symmetrical and convenient guide and support for the effective locking part, here shown as a pin, and because a position between the plates unduly separates the plates and the strips 1, 2 at their outer ends; but I purpose using the terms "strips" and "slide" in the claims in referring to this part in order to include any part or element limited in its movement and performing the function stated, without regard to the side of the two plates 9, 10 upon which it may lie, nor to its being outside, as distinguished from between the plates.

Having thus described my invention, what I claim as new and desire to secure by Letters Patent is:

1. In a device of the character stated, a pair of collapsible strips quarter-turned near each end to provide for pivotal connection to move directly toward and from each other, pivots therefor at each end thereof, a lock for the outer ends of the strips, a handle laterally slotted at one end to receive the strips and ears extending in proximity to the slots for supporting the edges of the strips therebeyond.

2. In a device of the character stated, a collapsible net frame, means for locking it in open position, telescopic handle sections within which said frame is adapted to slide, a grip fitting on the larger of said telescopic sections and a fitting upon the smaller of said sections, adapted to engage the grip when the telescopic sections are removed.

3. In a device of the character stated, a hollow handle section, transversely slotted at its outer end, flat net frame members adapted to enter said handle section, having their sides perpendicular to the planes of said slots throughout the major part of the net frame and quarter-turned in proximity thereto to bring the sides of the end portions parallel therewith, entering the slot and supported laterally thereby, a pivot pin for the inner ends and a lock for the outer ends of said frame.

4. In a device of the character stated, a hollow handle section, transversely slotted at its outer end, spring side net frame strips adapted to enter said handle section, having their sides perpendicular to the planes of the slots throughout the greater part of their length and quarter-turned in proximity to the slots to fit therein, a lock for the outer ends of said strips and ears in proximity to the slots engaging the edges of said strips.

5. In a device of the character stated, normally straight spring side net frame members quarter-turned at the outer and inner ends thereof, a lock and pivot for the outer ends, a pivot for the inner ends and a handle slotted for passage of the pivoted inner ends when extended, and within which the collapsed frame is adapted to telescope.

6. In a collapsible landing net, side net frame strips, means for securing and holding them at their inner ends, plates at their outer ends, recessed oppositely throughout an arc and grooved additionally in proximity to one extremity of the arc, a pivot for said plates, a strip and means upon said strip normally riding within the recesses and adapted to pass within the slots to lock the plates.

7. In a collapsible landing net, side net frame strips, a net thereon, pivots for the inner and outer ends of the strips, plates upon the outer ends of the strips having corresponding and oppositely placed circumferential recesses and communicating slots and means riding in said recesses and capable of engagement within the slots for locking the strips in extended position.

8. In a collapsible landing net, side spring net frame members, terminal plates therefor circumferentially recessed and more deeply grooved near the terminals of the recesses and a lock adapted to ride within the recesses and pass within the grooves.

9. In a collapsible landing net, side net frame members, a lock for the outer ends thereof, a stub, a pivot for the inner frame members upon the stub, a slotted handle and projections from the outer end of said handle adjacent to these slots for supporting the frame members beyond the slots.

10. In a device of the character stated, a hollow handle, having its outer end transversely slotted, side supports extending beyond the slots and in proximity to them, collapsible flat net frame side strips, having their sides in the direction of the depth of the net throughout the greater part of their length, extending thus toward the handle far enough for their edges to engage the supports and axially quarter-turned to pass within the slots, pivots for the strips, and a lock for the outer ends of the strips.

GOTTHARD A. BORGARDT.

Witnesses:
 HELEN I. KAUFFMAN,
 WILLIAM STEELL JACKSON.